Patented Sept. 20, 1932

1,877,791

UNITED STATES PATENT OFFICE

OTTO BAYER, OF FRANKFORT-ON-THE-MAIN, GERMANY, ASSIGNOR TO GENERAL ANILINE WORKS, INC., OF NEW YORK, N. Y., A CORPORATION OF DELAWARE

VAT DYESTUFFS OF THE ANTHRAQUINONE SERIES

No Drawing. Application filed October 28, 1931, Serial No. 571,683, and in Germany November 7, 1930.

My present invention relates to new vat dye-stuffs and more particularly to those corresponding to the general formula

wherein $R^1$ means a radical of the anthraquinone series and $R^2$ a radical of the diphenyl series).

They are obtained by condensing an anthraquinone compound containing at least one amino group in an α-position with a diphenyl-mono carboxylic acid halide or anhydride which may be substituted, for example by halogen, alkoxy, alkyl, aryl or acylamino groups (obtained by treating the corresponding acetyl- or ω- halogenated acetyl compound with an alkaline hypochlorite solution). The process is advantageously carried out in the presence of a solvent of high boiling point. Acid-binding agents may be also added.

The new vat dyestuffs yield yellowish dyeings of satisfactory fastness properties. In intensity and affinity for cotton, they surpass the analogous dyestuffs obtained by starting from other aromatic carboxylic acid halides.

In order to further illustrate my invention the following examples are given, the parts being by weight and all temperatures in centigrade degrees, but it is however to be understood, that my invention is not limited to the particular products nor reacting conditions mentioned therein.

Example 1

22 parts of 1-amino-anthraquinone are dissolved in about 500 parts of boiling ortho-dichloro-benzene. The solution is mixed during a short time with 22 parts of diphenyl-4-carboxylic-acid-chloride. When the evolution of hydrochloric acid has ceased (after about half an hour) the yellowish brown solution is allowed to cool. The dyestuff precipitated in yellow crystals is filtered off and washed with alcohol. It corresponds to the formula:

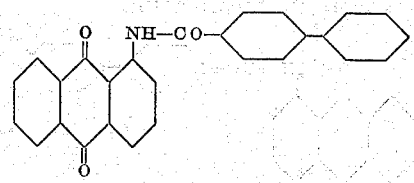

It melts at 254° and dyes cotton and wool from a bluish red vat very clear intense greenish yellow shades of very good fastness.

The same dyestuff is obtained by replacing diphenyl-4-carboxylic acid chloride by the equivalent amount of the anhydride of diphenyl-4-carboxylic acid.

By starting from 25 parts of 1-amino-6- (or 7-) chloro-anthraquinone instead of 22 parts of 1-amino-anthraquinone a more reddish dyeing compound is obtained.

Example 2

Into a solution of 34 parts of 1-amino-5-benzoyl-amino-anthraquinone in about 700 parts of trichloro-benzene, 21 parts of diphenyl-4-carboxylic-acid chloride are introduced at 180° C. while stirring. With an intense evolution of hydrochloric acid the formation of the dyestuff is complete in about half an hour. The dyestuff which crystallizes already in the hot is filtered at about 50° C. and washed with alcohol. The 5-benzoyl-amino-1-(diphenyl-4'-carboxyl-amino) anthraquinone of the formula

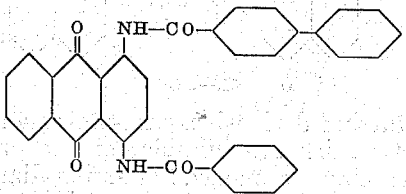

dyes from a claret red cold or hot vat clear full yellow shades which surpass that obtained from 1.5-di-benzoylamino-anthraquinone by intensity of color and affinity for the fiber. The new product dissolves in concentrated sulphuric acid with a yellowish brown tint.

Similar dyestuffs are obtained by substituting in the above examples diphenyl-4-carboxylic acid by its isomers or substitution products as for example 2-chloro-diphenyl-4-carboxylic acid chloride, 2-methoxy-diphenyl-5-carboxylic-acid chloride or ter-phenyl-carboxylic acid chloride.

*Example 3*

A mixture of 25 parts of 1-amino-4-methoxy-anthraquinone, 500 parts of nitrobenzene, 3 parts of collidine and 23 parts of diphenyl-4-carboxylic acid chloride is heated to 190° C. for about half an hour. When cool the dyestuff which is precipitated in red crystals is filtered, washed with alcohol and dried. It corresponds to the formula

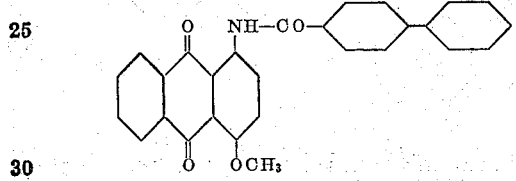

and dyes cotton from an orange vat very bright yellowish orange shades.

By replacing 1-amino-4-methoxy-anthraquinone by 34 parts of 4-amino-1.2-phenylimidazole-anthraquinone a new dyestuff is obtained which dyes from a brownish red vat fast yellowish orange shades.

*Example 4*

12 parts of the reduced condensation product prepared from 5-nitro-anthraquinone-2-carboxylic acid chloride and 1-amino-5-benzoyl-amino-anthraquinone are mixed with 4, 5 parts of diphenyl-4-carboxylic acid chloride at 200° C. in about 200 parts of trichlorobenzene. The mixture is stirred until the evolution of hydrochloric acid has ceased. The dyestuff precipitated in golden yellow crystals dyes from a claret red vat intense greenish yellow shades. It corresponds to the formula

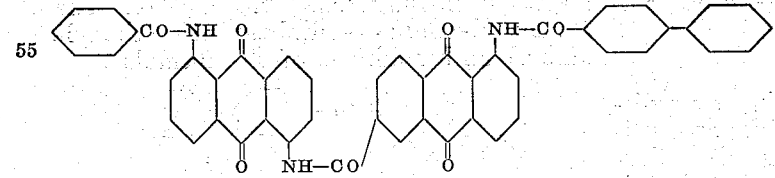

As further derivatives of 1-amino-anthraquinone which are suitable for the present process may be named: diamina-dianthrimides and their derivatives containing a carbazole nucleus and aminoanthraquinone-1.2-acridones.

I claim:
1. As new compounds the vat dyestuffs of the general formula

$$R^1-NH-CO-R^2$$

(wherein $R^1$ means a radical of the anthraquinone series and $R^2$ a radical of the diphenyl series), which compounds dye cotton and wool from the vat yellowish shades.

2. As a new compound the vat dyestuff of the formula

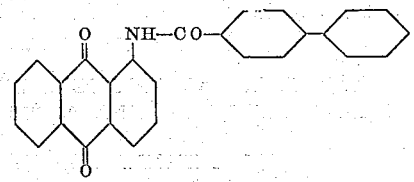

which compound represents yellow crystals melting at 254°, dyeing cotton and wool from a bluish red vat very clear intense greenish yellow shades of a very good fastness.

In testimony whereof, I affix my signature.
OTTO BAYER.